US007463935B1

(12) United States Patent
Miller et al.

(10) Patent No.: US 7,463,935 B1
(45) Date of Patent: Dec. 9, 2008

(54) MESSAGE QUEUING IN AN INDUSTRIAL ENVIRONMENT

(75) Inventors: Scott A. Miller, Oakdale, PA (US); John T. Campbell, Jr., Bridgeville, PA (US); Mark A. Glavach, Slippery Rock, PA (US); Keith A. Overstreet, Pittsburgh, PA (US); Randall P. Sadowski, Hookstown, PA (US); David T. Sturrock, Evans City, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/371,432

(22) Filed: Mar. 9, 2006

(51) Int. Cl.
*G05B 15/00* (2006.01)
*G06F 17/00* (2006.01)
*G06F 19/00* (2006.01)

(52) U.S. Cl. .............................. 700/1; 700/90; 700/95; 700/96; 700/97

(58) Field of Classification Search .................. 700/1; 707/4
See application file for complete search history.

(56) References Cited

U.S. PATENT DOCUMENTS

| 5,208,998 | A | * | 5/1993 | Oyler, Jr. ..................... 34/288 |
| 5,422,130 | A | * | 6/1995 | Fox et al. ..................... 426/234 |
| 6,061,603 | A |   | 5/2000 | Papadopoulos et al. |
| 6,088,665 | A | * | 7/2000 | Burns et al. ................. 702/188 |
| 6,615,091 | B1 | * | 9/2003 | Birchenough et al. ......... 700/96 |
| 6,781,972 | B1 | * | 8/2004 | Anderlind et al. ........... 370/329 |
| 6,845,452 | B1 | * | 1/2005 | Roddy et al. ................... 726/11 |
| 7,015,599 | B2 | * | 3/2006 | Gull et al. ...................... 307/85 |
| 2001/0034782 | A1 | * | 10/2001 | Kinkade ..................... 709/219 |
| 2003/0031164 | A1 |   | 2/2003 | Nabkel et al. |
| 2003/0110314 | A1 |   | 6/2003 | Barnes |
| 2003/0115366 | A1 |   | 6/2003 | Robinson |
| 2003/0135547 | A1 |   | 7/2003 | Kent et al. |
| 2004/0056896 | A1 |   | 3/2004 | Doblmayr et al. |
| 2004/0168201 | A1 | * | 8/2004 | Tada et al. .................. 725/132 |
| 2004/0205770 | A1 |   | 10/2004 | Zhang et al. |
| 2005/0165980 | A1 |   | 7/2005 | Clayton et al. |
| 2005/0204061 | A1 | * | 9/2005 | Farchmin et al. ............ 709/245 |
| 2005/0262205 | A1 |   | 11/2005 | Nikolov et al. |
| 2005/0267882 | A1 | * | 12/2005 | Aupperlee et al. ............. 707/4 |
| 2006/0020678 | A1 |   | 1/2006 | Kessler |

OTHER PUBLICATIONS

Wikipedia definition, for "communication protocol".*

* cited by examiner

*Primary Examiner*—Albert DeCady
*Assistant Examiner*—Sunray R Chang
(74) *Attorney, Agent, or Firm*—Amin Turocy & Calvin LLP; William R. Walbrun

(57) ABSTRACT

An industrial controller that can be utilized in an environment that supports message queuing comprises a receiver component that receives a message from a queue, wherein the message conforms to a message queuing protocol. A message queuing component communicatively coupled to the receiver component interprets the message and alters control logics within the controller based at least in part upon contents of the message. Furthermore, for example, the message queuing engine can be configured to generated messages that conform to the message queuing protocol.

32 Claims, 12 Drawing Sheets

MESSAGE QUEUING IN AN INDUSTRIAL ENVIRONMENT

TECHNICAL FIELD

The claimed subject matter relates generally to industrial processes and, more particularly, to providing controllers with capabilities to utilize message queuing to receive, implement, and publish messages.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Utilizing such data, industrial applications are now becoming partially and/or completely automated.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors Sensors, actuators, drives, and the like are communicatively coupled to such ports/adaptors. Thus, a controller can recognize device identity when data is received and further deliver control data to an appropriate device.

Controllers, however, are extremely limited as to their abilities to communicate with associated applications and/or processes. For example, customized and complex mapping software is often needed to enable a programmable logic controller to communicate with an application that is associated with an Enterprise Resource Planning (ERP) system. Monetary costs for assigning an application writing specialist to perform such mapping can be quite large. Additionally, today's controllers typically are not capable of performing asynchronous communications with high-level applications. In other words, the controller and the application must be connected and communicating synchronously to effectuate desirable interaction there between. Such forced synchronization can be problematic when the controller is assigned numerous tasks, many of which are to be performed in real-time. Thus, synchronously communicating with a high-level application can negatively affect other tasks associated with the controller.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter described herein enables message queuing to be implemented within an industrial environment on the factory floor. In more detail, controllers can be equipped with functionality that enables them to receive and interpret messages that conform to a message queuing protocol. Thus, synchronous communication is not required in connection with the controller and applications that are associated therewith. Rather, for example, an application can provide a message intended for the controller to a queue, which is responsible for retaining messages until they are requested from an entity that is to receive the messages. The queue can reside in any suitable location, such as within a controller or other factory floor level device, within a server (such as a web server), etc. Once the application has provided the queue with the message, the application and the queue can become disconnected. The controller can monitor the queue (connect to the queue) and request messages that are intended for the controller. These messages can then be provided to the controller (or access to the messages can be provided to the controller), and the controller can disconnect from the queue. A message can then be interpreted, and control logics within the controller can be updated based upon content of the message.

Additionally, controllers can be configured to generate messages that conform to a message queuing protocol. For instance, after control logics of a controller have been updated based upon content of a message, the controller can generate a report that is intended for the application. The report can be provided to the queue from the controller and retained therein until one or more applications that are to receive the report access the queue and request messages. Thus, the application and the controller need not remain connected to effectively communicate with one another—rather, the use of a message queuing protocol enables an application and the controller to communicate asynchronously with one another, connecting to the queue and disconnecting from the queue when providing and/or retrieving messages to/from the queue.

In addition, previous states of controllers, applications, devices, and the like can be retained after alteration is made to the controllers, applications, etc. Such retention enables rollback to a recent acceptable state if there is a failure within the system. Pursuant to an example, an application can provide a message to a queue, and thereafter alter state based upon a belief that the message has been implemented. However, the queue may fail and/or the message may not reach an intended recipient for any number of reasons, leaving the application and the intended recipient (e.g., the controller) in inconsistent states. For example, network failure may cause the message to fail to reach an intended recipient. Additionally, a message may "time out" due to a high amount of network traffic—thus, the message may eventually reach an intended recipient, but the time delay could trigger rollback. Upon detection of any suitable sort of failure, the application can be rolled back to a previous state.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
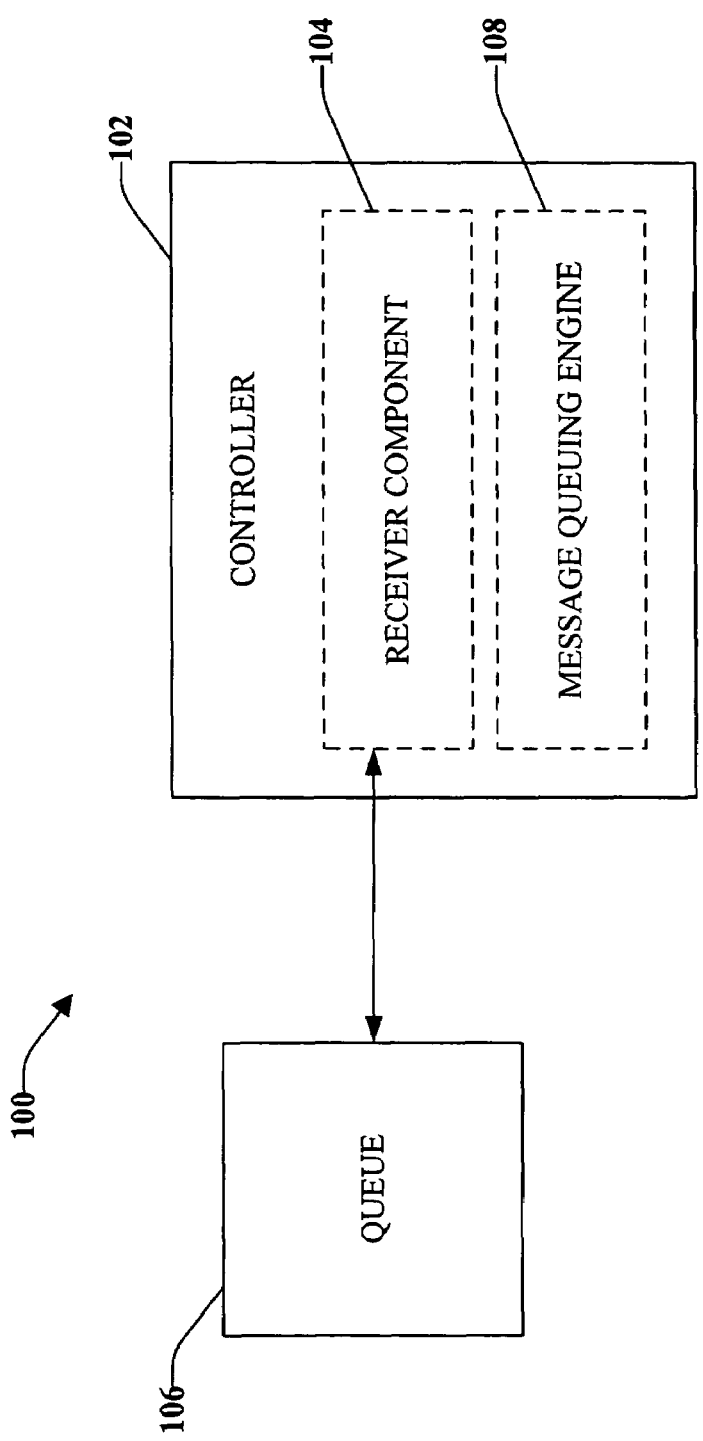
FIG. 1 is a high level block diagram of a system that enables a controller to send, receive, and interpret messages that conform to a message queuing protocol.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a message queuing system 100 that can be implemented within an industrial environment. The message queuing system 100 includes a controller 102 that is employed in connection with controlling one or more processes on a factory floor. The controller 102, for example, can be associated with a plurality of other controllers to effectuate control of a process (e.g., the controller 102 can be communicatively coupled to several other controllers in a rack by way of a backplane). The controller 102, in connection with controlling one or more processes, can receive status of sensors, actuators, drives, and the like, and based at least in part upon the statuses (and control logics associated with the controller 102) the controller 102 can alter state of associated actuators.

The controller 102 can include a receiver component 104 that can receive data, commands, and/or messages from a queue 106 and can deliver messages from the controller 102 to the queue 106. The queue 106 can be communicatively coupled to a disparate industrial device and/or an application, wherein the device and/or application are configured to effectuate message queuing. Message queuing is a protocol that enables different devices and/or applications to asynchronously communicate with one another. In other words, a sender and a receiver of a message do not need to connect to the queue 106 at a substantially similar instance in time. Additionally, messages provided to the queue 106 can remain in such queue 106 until retrieved by an intended recipient of the message.

The controller 102 additionally includes a message queuing engine 108 that enables the controller 102 to interpret, implement, generate, and send messages that conform to a message queuing protocol. Examples of such protocols include the MQ protocol, WebSphere MQ, Advanced Queuing (AQ) protocol, MSMQ, Web Service Message Queue (WSMQ), JBossMQ, and any other suitable message queuing protocol. In more detail, an application (not shown) can publish a message that is intended for the controller 102 and provide such message to the queue 106. The queue 106, for example, can reside within a server, within the controller 102, or in any suitable storage medium. The queue 106 can then inform the controller 102 of the existence of a message by providing an indication of such existence to the receiver component 104. Additionally or alternatively, the receiver component 104 can poll the queue to determine if a message is within the queue 106 that is intended for the controller 102. For example, several controllers (or other suitable industrial devices) can be communicatively coupled to the queue 106, such that the devices and/or applications can asynchronously communicate with one another.

After the message is received form from the queue 106, the message queuing engine 108 can update operation of the controller 102 based upon content of the message. For instance, the message can include instructions or parameters for altering control logics associated with the controller 102, and upon receipt of the message by the message queuing engine 108 the control logics can be updated according to the content of the message. In a detailed example, a torque wrench can be employed within an assembly line to attach a wheel to an axle on an automobile. When the automobile is traversed into a particular station, a production system can place a message in the queue 106 indicating that a particular value should be utilized with respect to the torque wrench. The receiver component 104 can receive such message (through polling, active retrieval, and the like) and the message queuing engine 108 can subsequently implement content of the message (to adjust the torque wrench, for example). Thereafter, the message queuing engine 108 can generate a message relating to completion of a task or alteration based upon content of the message executed by the message queuing engine 108. The generated message can be provided to the queue 106 (or a different queue) by way of the receiver component 102, and a control system can pick up such message from the queue 106.

Thus, the receiver component 104, the message queuing engine 108, and the queue 106 enable the controller 102 to asynchronously communicate with other devices and/or applications. In contrast to synchronous systems, the controller 102 need not maintain a connection to an application. For example, when communicating with higher level systems, a controller receives a request and replies to such request while maintaining a connection with the higher level system. The system 100 enables the controller 102 to initiate asynchronous communication with other devices and/or applications. For instance, the controller 102 can notify an application that an event has occurred but does not need to wait for a response. Rather, the controller 102 can redirect resources to a current control application.

Figure 2:
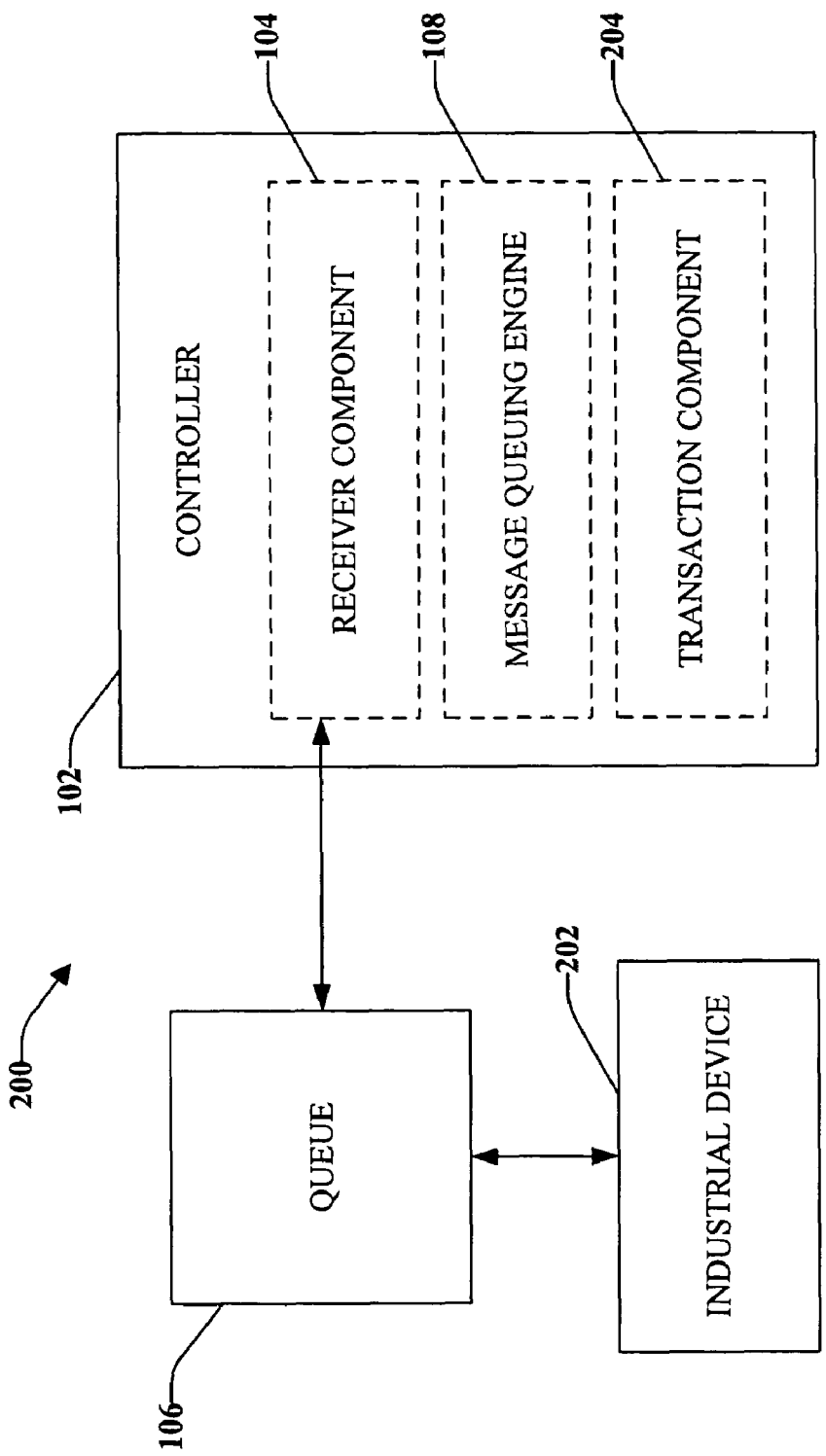
FIG. 2 illustrates a system that facilitates rollback to a previous state if there is a failure in a message queuing system.

Now referring to FIG. 2, a system 200 is illustrated that enables controllers to communicate with other applications or devices by way of a message queuing protocol. The system 200 includes the controller 102 that is associated with one or more processes. The controller 102 includes the receiver component 104 that can receive, retrieve, and/or deliver a message that conforms to a message queuing protocol to and/or from the queue 106. The message queuing engine 108 can be communicatively coupled to the receiver component 104 and can execute commands that are within a message. Upon altering state of the controller 102, the message queuing engine 108 can generate a message and provide such message to the queue 106. Additionally, the message queuing engine 108 can maintain records of alterations within local storage of the controller 102 (or other attached storage).

The system 200 can additionally include an industrial device 202 that can communicate by way of a message queuing protocol with the controller 102. The industrial device 202 can be, for example, a controller, a server, a personal computer, a personal digital assistant (PDA) or other suitable portable computing device, a laptop computer, and the like. The industrial device 202 can act as described above with respect to the controller 102. In other words, the industrial device 202 can include an application that can publish or provide messages to the queue 106 that are intended for the controller 102. The controller 102 can then receive/retrieve the message from the queue 106 by way of the receiver component 104, and the message queuing engine 108 can generate a message in response. Such generated message is provided to the queue 106 via the receiver component 104 and the industrial device 202 can access the queue 106 when needed. It is understood that either the industrial device 202 or the controller 102 can initiate communications by providing a message to the queue 106.

Oftentimes, after generating a message, devices (such as controllers) and/or applications may change state. If, however, a desired recipient of the device is unavailable (e.g., has lost power, crashed, or the like), the change of state may need to be reversed after time has passed. Similarly, the queue 106 may be subject to failure, leaving the device/application that generated the message in a state that is inconsistent with the state of the intended recipient of the message. A transaction component 204 can be provided to make up for this deficiency, wherein the transaction component 204 can be utilized to maintain consistencies between message providers and message recipients within the system 200. For instance, the transaction component 204 can effectuate rollback of the industrial device 202 (or application therein) and the controller 102 given a system failure. Thus, the transaction component 204 enables different devices or applications to remain consistent when a network or system fails, or for any failure of a message to reach an intended recipient. While shown as being within the controller 102, it is understood that the transaction component 204 can be distributed amongst devices, associated with the queue 106, or any other suitable location. In one particular example, the transaction component 204 can initiate rollback after a particular amount of time passes without the intended recipient receiving the message and/or confirming receipt of the message (e.g., the message has timed out). In another example, the transaction component 204 can initiate rollback upon one or more particular alarms being raised within a system/process.

Figure 3:
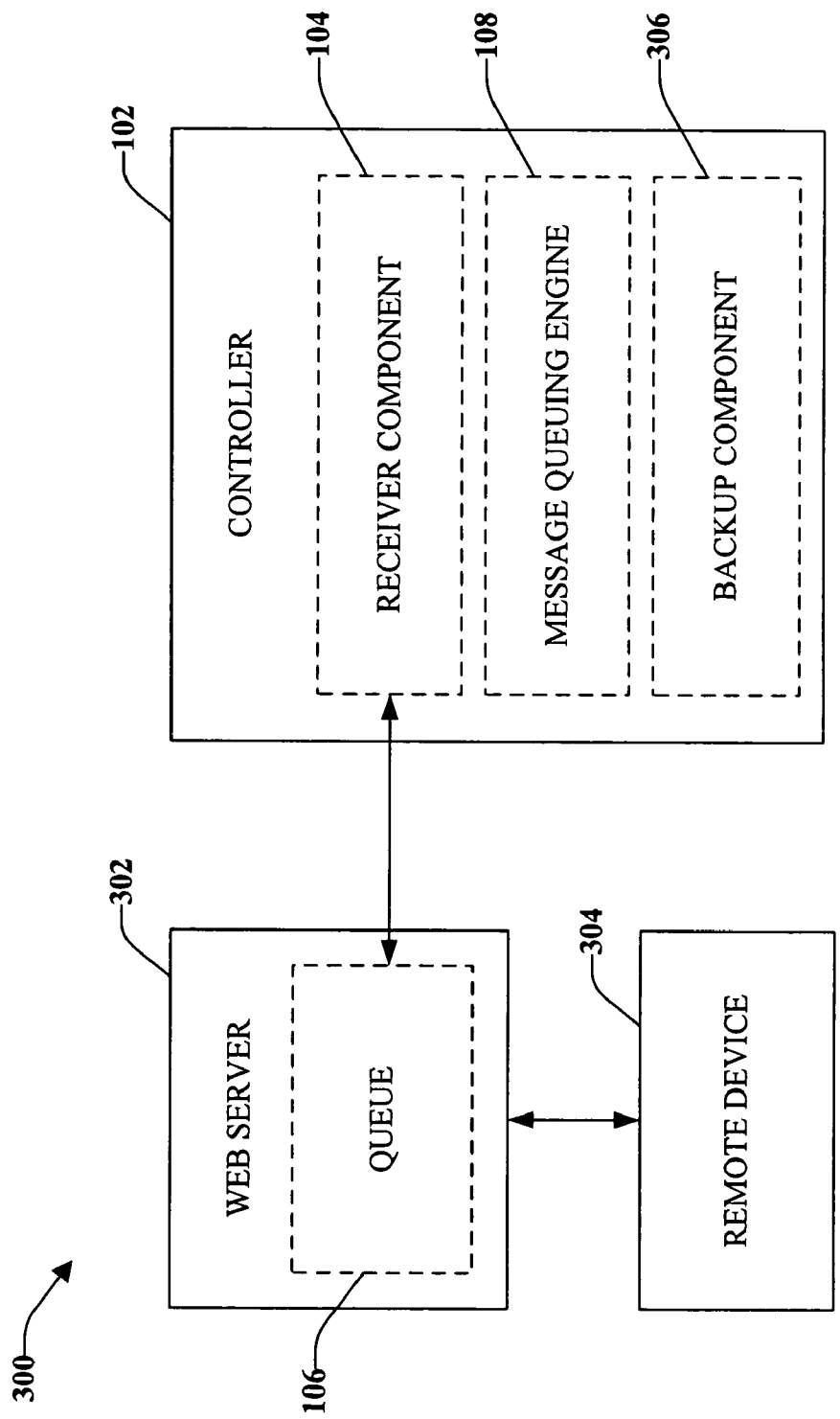
FIG. 3 illustrates a system that enables a remote device to communicate with a controller through message queuing.

Referring now to FIG. 3, a system 300 that facilitates implementation of a message queuing protocol in connection with controllers is illustrated. The system 300 includes the controller 102 that is configured to control one or more industrial processes. The controller 102 includes the receiver component 104 that is employed to send, receive, and/or retrieve messages, wherein the messages can conform to a message queuing protocol (such as, for example, MQ). In more detail, the receiver component 104 can be communicatively coupled to the queue 106, wherein the queue 106 is employed to retain messages until the controller 102 is prepared to receive the messages and/or until a disparate device or application is prepared to receive a message generated by the controller 102. As illustrated, the queue 106 can optionally reside within a web server 302, thereby enabling bi-directional communications to occur between the controller 102 and a remote device 304 over a network (such as the Internet). The remote device 304 can be a server, a personal computer, a PDA, a controller, or any other suitable device. Additionally, the web server 302 can include an application (not shown) that communicates with the controller 102 by way of the message queuing protocol. Thus it is understood that the controller 102 can bi-directionally communicate with any other suitable remote device.

As described above, the message queuing engine 108 can receive messages that conform to the message queuing protocol and alter content of the controller 102 based at least in part upon content of the messages. Additionally, the message queuing engine 108 can generate messages that conform to such protocol and provide them to the queue 106 by way of the receiver component 104. For instance, generated messages can include an identity of an intended recipient of the message. The controller 102 can further include a backup component 306 that is employed to record instances of change within the controller 102. Pursuant to an example, the remote device 304 can provide a message to the queue 106 that is intended for the controller 102. The controller 102 can connect to the queue 106 at a suitable instance in time and retrieve/receive the message from the queue 106 through employment of the receiver component 104. The message queuing engine 108 can execute commands based upon content of the message, thereby altering content of the controller 102. The message queuing engine 108 can then generate a message that is provided to the queue 106 indicating the change of content of the controller 102. If, however, the queue 106 fails (e.g., the web server 302 goes offline), it may be desirable to keep record of changes in the controller 102. Accordingly, the backup component 306 can record alterations that are associated with the controller 102. For example, an individual or entity could interrogate the controller 102 and review alterations made to such controller through employment of the backup component 306.

Figure 4:
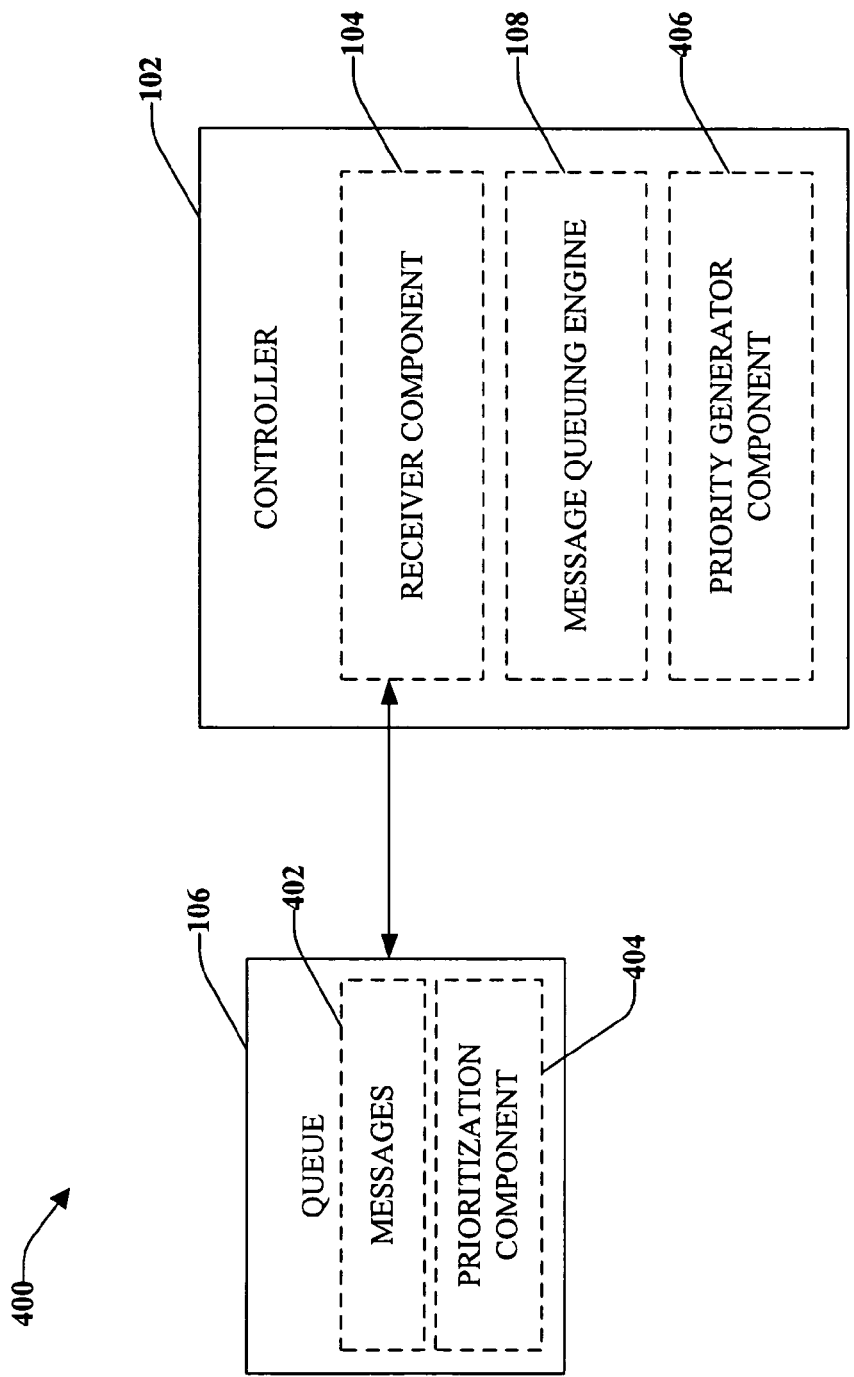
FIG. 4 illustrates a message queuing system within an industrial environment, wherein messages can be automatically prioritized.

Now referring to FIG. 4, a system 400 that facilitates utilization of message queuing within an industrial environment is illustrated. The system 400 includes the controller 102 that comprises the receiver component 104 which is communicatively coupled to the queue 106. With more specificity, the queue 106 can include messages 402 that are generated by the message queuing engine 108 and/or are generated by a disparate device and/or application and are created for delivery to the controller 102. Some messages that are created by the message queuing engine 108 may be associated with greater urgency than others. Pursuant to an example, the queue 106 can include four messages that are intended for the controller 102. The queue 106, to aid in determining an order of messages to provide to the controller 102, can include a prioritization component 404. For instance, the prioritization component 404 can enforce a default first-in, first-out (FIFO) algorithm in connection with making available messages to the controller 102 (and/or to a disparate application). In another example, messages 402 can be associated with a priority measure. For instance, messages provided to the queue 106 can be associated with an attribute that indicates a level of priority associated with the message. Therefore, a message with an attribute that indicates that the message should be given high priority will be made available to the controller 102 prior to a message that is associated with low priority (regardless of order of receipt of the messages within the queue 106). In still another example, messages can be associated with priority attributes that are dependent upon time. Pursuant to an example, priority associated with a message can increase as time that the message remains within the queue 106 increases. For instance, upon initial provision to the queue 106, a message can be associated with a low priority (e.g., if the controller 102 does not immediately need to receive the message). Upon passage of time, however, it may become more urgent for the controller 102 to receive the message. Thus, the priority associated with the message can alter as the message resides within the queue 106. In another example, instead of reprioritizing messages, a message could be deleted and another message issued in its place (similar to alarming systems, where a most recent alarm is actionable).

The prioritization component 404 can analyze the messages 402 within the queue 106 and make them available to the controller 102 based upon priority of the messages, whether such priorities are based upon FIFO, priorities associated with the messages, and the like. Moreover, the prioritization component 404 can function to prioritize messages with respect to a plurality of controllers. For instance, multiple controllers can be associated with the queue 106; thus the queue 106 can retain messages for such controllers. The prioritization component 404 can make available multiple messages to multiple controllers according to priorities determined by such component 404. In addition, the prioritization component 404 can make inferences regarding how to prioritize the messages 402. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

In a detailed example, context of an industrial environment may alter priority of messages, and the prioritization component 404 can make inferences based upon such context. For instance, an alarm can be generated that can cause priorities to alter. The prioritization component 404 can receive notification of the alarm and make an inference relating to priorities of messages within the queue 106. Due to numerous alarms and relationships between devices, hard and fast rules may not exist for each situation. Accordingly, the prioritization component 404 can infer priorities.

The controller 102 can additionally include a priority generator component 406 that assigns priorities to messages created by the message queuing engine 108. As alluded to above, the priority generator component 406 can assign priorities that alter over time. Moreover, the priority generator component 406 can be associated with a time stamp generator that enables messages generated by the message queuing engine 108 to be associated with a particular time. The time stamp enables the prioritization component 404 to enforce a first-in-time priority of messages.

Figure 5:
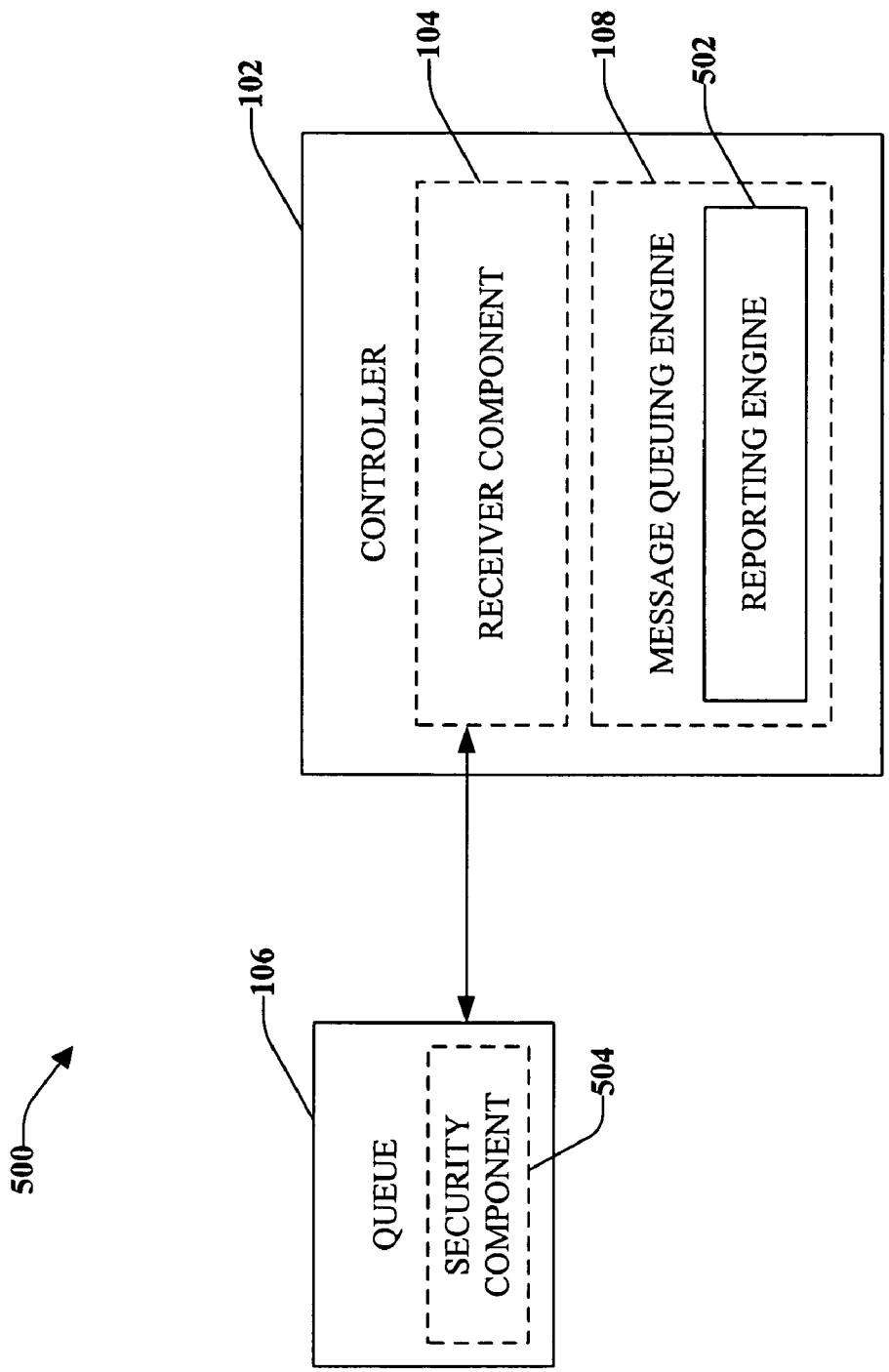
FIG. 5 illustrates a message queuing system within an industrial environment, wherein a controller can generate reports that conform to a message queuing protocol.

Turning now to FIG. 5, a system 500 that facilitates utilization of a message queuing protocol within an industrial automation environment is illustrated. The system 500 includes the controller 102 that is associated with one or more processes in an industrial environment. The controller 102 includes the receiver component 104 that is utilized to retrieve/receive/deliver messages that conform to a message queuing protocol (such as MQ) from/to the queue 106. The message queuing engine 108 can receive messages and execute content of such messages, thereby enabling alteration of content of the controller 102. Additionally, the message queuing engine 108 can include a reporting engine 502 that enables the message queuing engine 108 to generate reports relating to received messages. For instance, a report generated by the reporting engine 502 can indicate that a task has been completed, can indicate status of a process, can include audit data, or any other suitable data that can be in a report. Furthermore, the reporting engine 502 can create reports that conform to the message queuing protocol. Such messages can be provided to the queue 106 by way of the receiver component 104 and retained within the queue 106 until an application that the message is intended for requests such message.

The queue 106 can additionally include a security component 504 that ensures that individuals or entities that provide messages to the queue 106 and/or request messages from the queue 106 are authorized to undertake such actions. For example, if an individual or entity wished to cause the system to fail, such individual or entity could provide an abundance of messages to the queue 106. In such an instance, the queue 106 would be filled beyond capacity and the system 500 would fail. The security component 504 can authenticate users or entities who are attempting to access the queue 106. For example, messages output from the controller 102 can be associated with particular data (e.g., a sequence of bits) that indicates identity of such controller 102. Furthermore, if desired, the security component 504 can include decoding algorithms that can enable such component 504 to decode encoded bit streams. Additionally, the security component 504 can request usernames, passwords, personal identification numbers, biometric indicia, and analyze such data to determine identity of the user. The security component 504 can then discern whether the individual requesting access to the queue is authorize for the requested access (e.g., authorized to provide messages to the queue 106 and/or authorized to retrieve messages from the queue 106). Additionally, it is understood that the security component 504 can be a part of a disparate application. For instance, one or more aspects of the security component 504 can be built into the queue 106 for overload prevention while another aspect of the security component 504 may be built into a security server for identity verification, authentication, etc.

Figure 6:
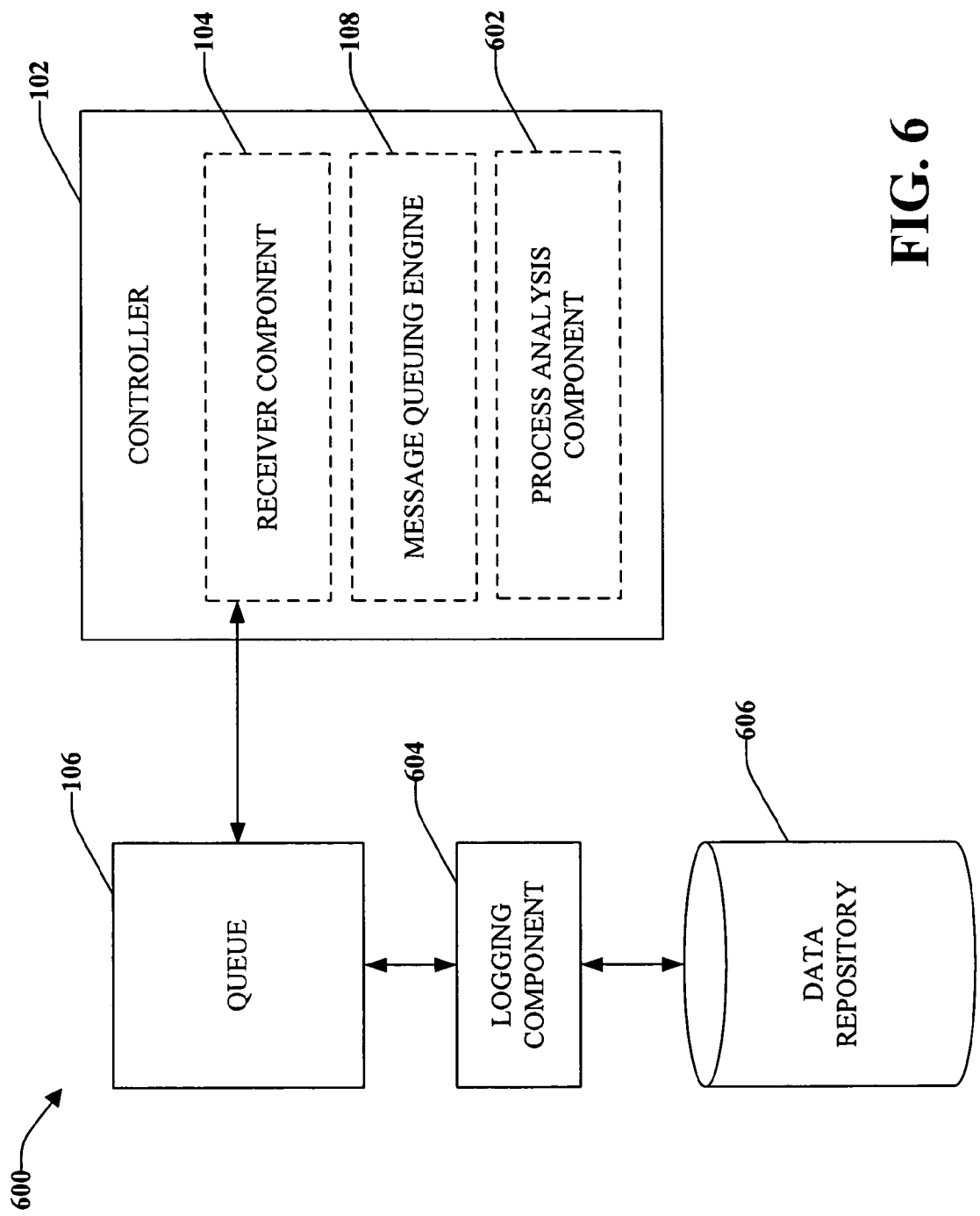
FIG. 6 illustrates a message queuing system within an industrial environment, wherein messages that conform to a message queuing protocol can be logged.

Now referring to FIG. 6, a system 600 that facilitates utilization of a message queuing protocol in an industrial environment is illustrated. The system 600 includes the controller 102 that is utilized to control at least a portion of an industrial process. The controller 102, as before, includes the receiver component 104 that is employed to communicate with the queue 106 (e.g., retrieve messages from the queue 106, receive messages from the queue 106, provide messages to the queue 106, . . . ). The controller 102 additionally includes the message queuing engine 108 that can receive messages that conform to the message queuing protocol (from the queue 106) and implement content of the received messages. Thus, the controller 102 can be updated by messages created in accordance with a message queuing protocol.

Furthermore, the controller 102 can generate messages that conform to the message queuing protocol based upon status of a process. In more detail, the controller 102 can include a process analysis component 602 that analyzes a process associated with the controller 102. For instance, the process analysis component 102 can monitor a process for alarms or predefined events (e.g., when a product is exiting a particular stage). The process analysis component 602 can then provide the message queuing engine 108 with details relating to the analysis, and the message queuing engine 108 can create a message based upon the analysis. The message queuing engine 108 can also dynamically determine an application or device that the message should be delivered to and provide such information within the generated message. The receiver component 104 can thereafter provide the message to the queue 106, where the message will remain until retrieved by the intended recipient.

The queue 106 can be associated with a logging component 604 that can be utilized to track actions associated with the queue 106. With more particularity, the logging component 604 can record when messages were provided to the queue 106, when messages are retrieved from the queue 106, content of messages, provider of messages, recipient of messages, and any other suitable data. The logging component 604 can be communicatively coupled to a data repository 606 that can retain logs generated by the logging component 604. The logging component 604 can further cause logs to be indexed in any suitable manner within the data repository 606, thereby enabling users of the system 600 to quickly access desired data.

Figure 7:
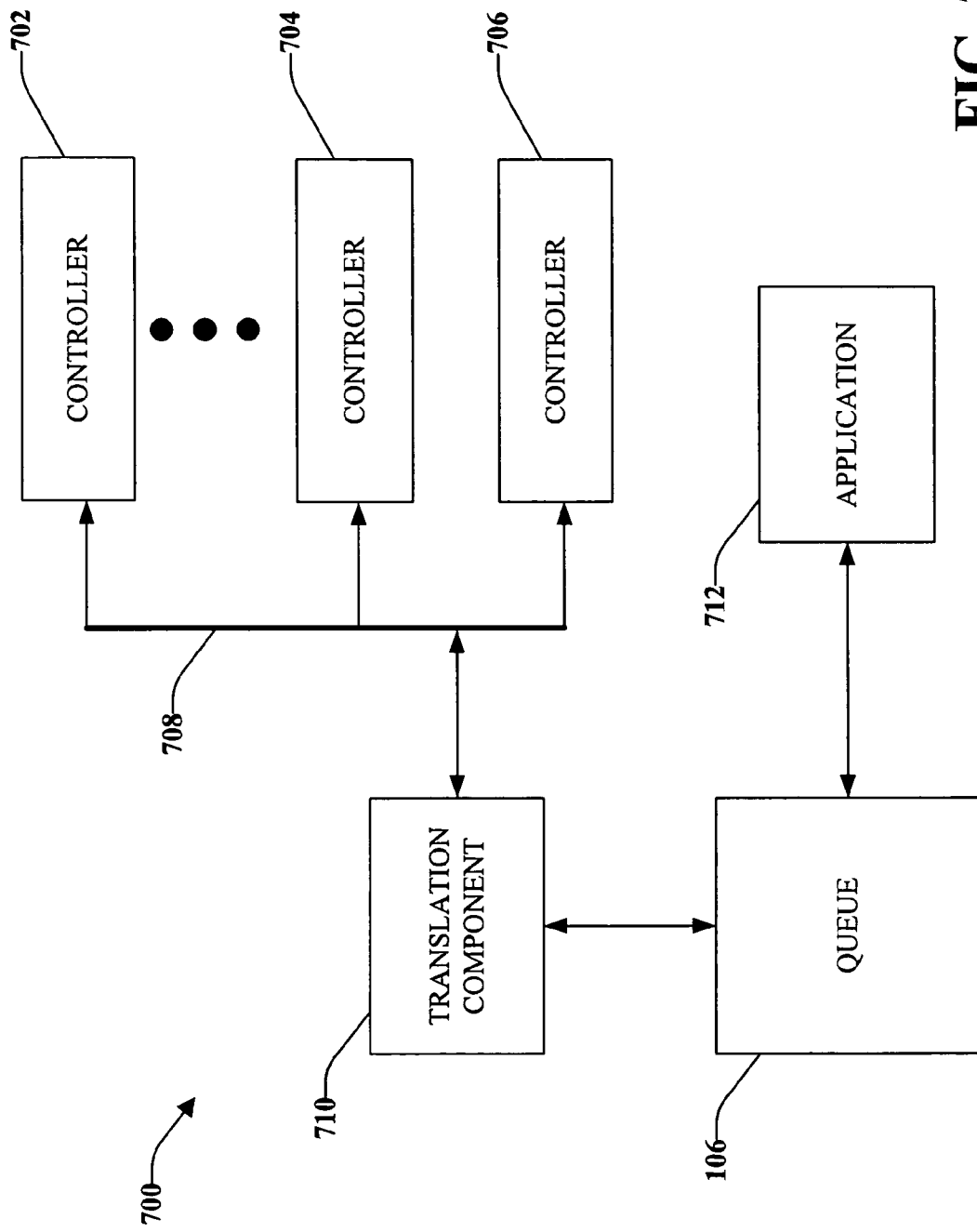
FIG. 7 illustrates a message queuing system that enables legacy controllers to communicate with an application by way of message queuing.

Referring now to FIG. 7, a system 700 that enables legacy controllers to communicate by way of a message queuing protocol is illustrated. The system 700 includes multiple controllers 702-706, wherein such controllers 702-706 can be characterized as legacy controllers. In other words, the controllers 702-706 may not include sufficient processing power, memory capabilities, or the like to include the message queuing engine 108 (FIGS. 1-6). In this example, the controllers 702-706 can be communicatively coupled by way of a backplane 708. To enable the controllers 702-706 to communicate by way of message queuing, a translation component 710 is associated with the controllers 702 that acts as a proxy between the queue 106 and the controllers 702-706. For instance, an application 712 can generate a message that conforms to a message queuing protocol and provide such message to the queue 106. For instance, the message can be intended for the controller 704. The translation component 710 can access the queue 710 and analyze messages therein and translate such messages to formats that can be interpreted by the controllers 702-706. In accordance with one aspect, the translation component 710 can include a hardware device that is coupled to the backplane 710.

The translation component 710 can also operate to translate data output from controllers to messages that conform to one or more message queuing protocols. For instance, the translation component 710 can monitor/collect data output by at least one of the controllers 702-706, and translate such data to a message in accordance to a message queuing protocol. The translation component 710 can then provide such message to the queue 106, which can retain the message until the application 712 requests such message from the queue 106 (e.g., until the application connects with the queue 106).

Figure 8:
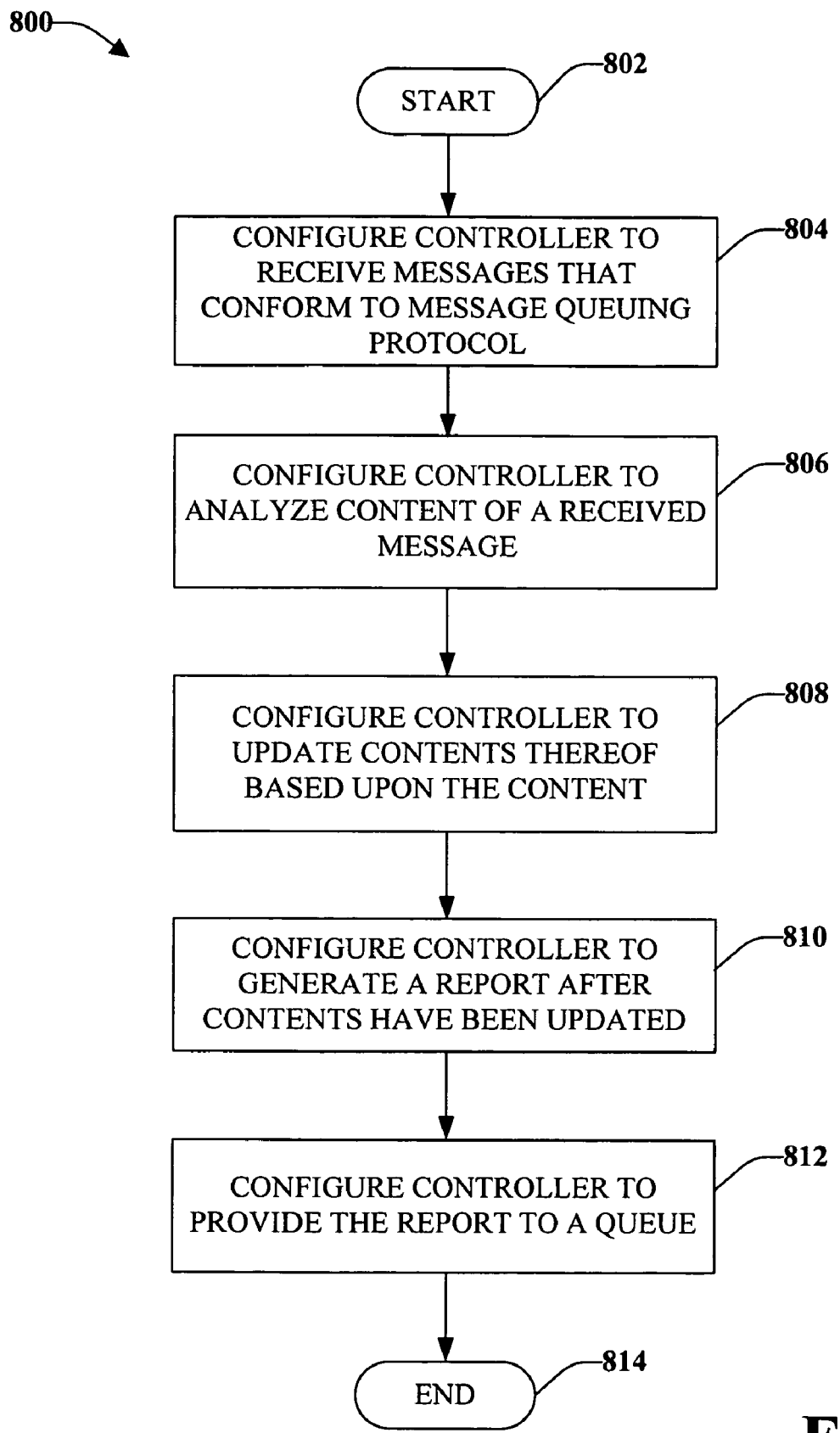
FIG. 8 is a representative flow diagram that illustrates a methodology for configuring a controller to communicate with a device/application by way of a message queuing protocol.
Figure 9:
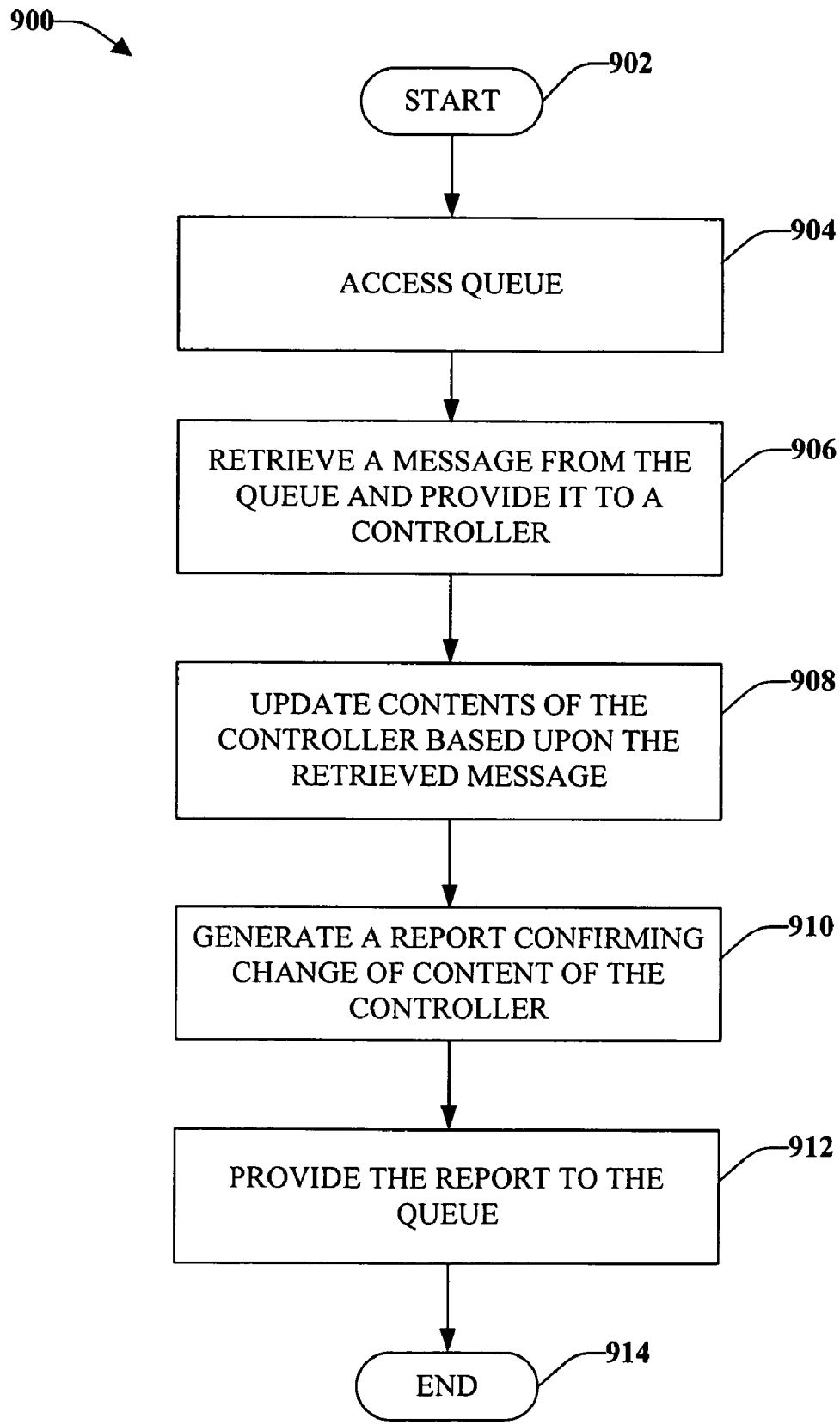
FIG. 9 is a representative flow diagram that illustrates a methodology for altering control logics of a controller by way of a message queuing protocol.
Figure 10:
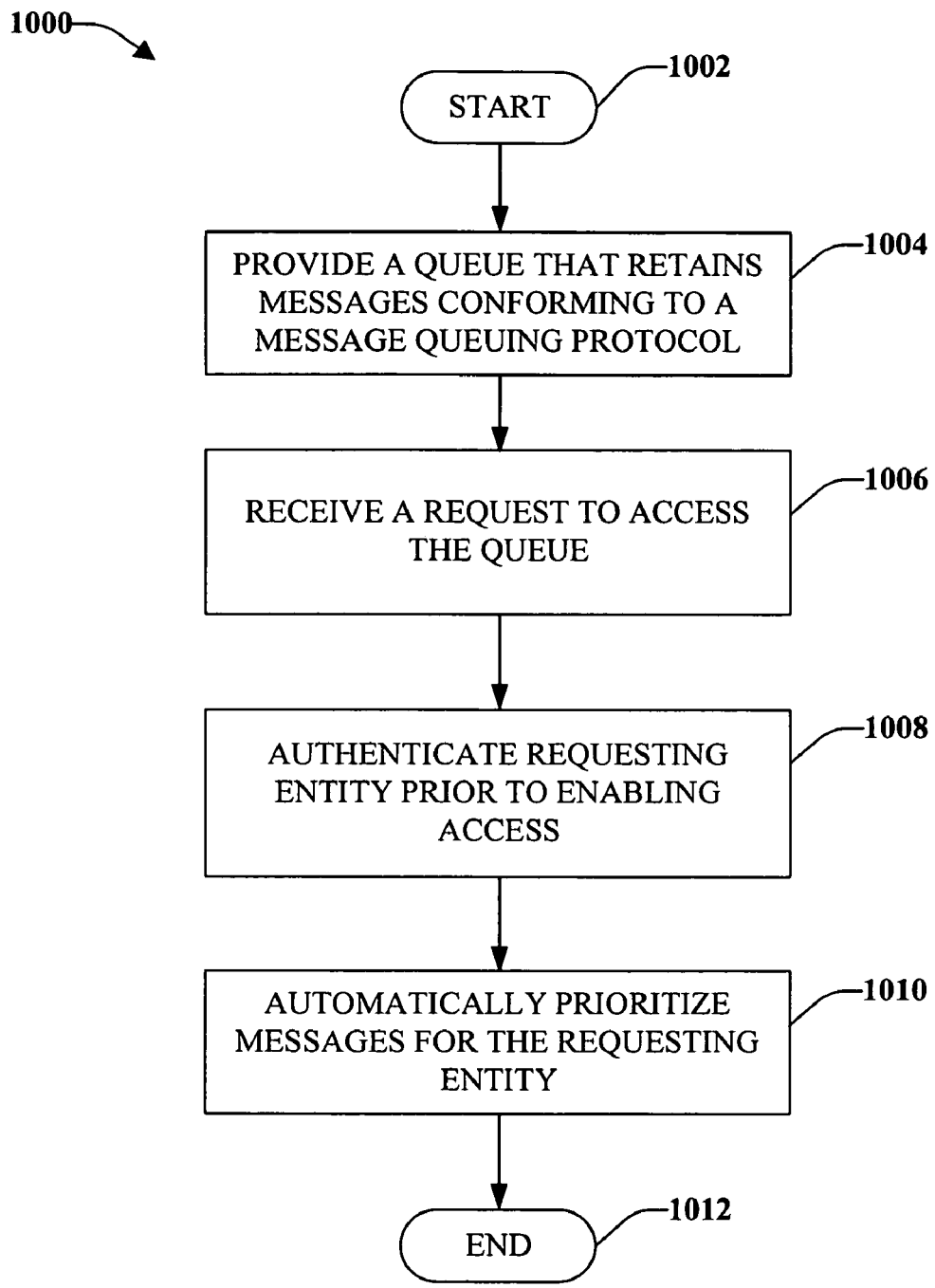
FIG. 10 is a representative flow diagram that illustrates a methodology for automatically prioritizing messages within a queue.

Turning to FIGS. 8-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 8, a methodology 800 for configuring a controller to enable receipt, generation, and implementation of messages that conform to a message queuing protocol is illustrated. The methodology 800 starts at 802, and at 804 the controller is configured to receive messages that conform to a message queuing protocol. For instance, the controller can be a programmable logic controller (PLC), a robotic controller, or any other suitable controller. The configuration can be enabled through providing particular software to the controller, updating firmware, and the like. Furthermore, ports can be associated with the controller to enable periodic connection of the controller with a queue, which can in turn be associated with multiple devices/applications that can also receive/generate/interpret messages that conform to the message queuing protocol.

At 806, the controller is configured to analyze content of a received message. For example, the controller can connect to the queue and request messages from the queue that are intended for the controller. The controller can then retrieve messages intended for the controller from the queue and analyze content of the messages. For instance, a message can indicate that a parameter associated with a torque wrench should be altered. At 808, the controller is configured to update contents of the controller based upon content of the message. Thus, for example, the controller can include a compiler that enables compilation and execution of received messages. Continuing with the above example, control logics within the controller can be updated to reflect an alteration in the torque wrench parameter. At 810, the controller is configured to generate a report after contents of the controller have been altered. At 812, the controller can be configured to provide the report to the queue. Therefore, an application associated with the controller can pick the report up from the queue at a desirable time, without forcing synchronous communications between the controller and the application.

Referring now to FIG. 9, a methodology 900 for implementing message queuing in connection with a controller within an industrial environment is illustrated. The methodology 900 starts at 902, and at 904 a queue is accessed by a controller. For instance, the controller can be configured to access the queue periodically, during downtimes of the controller (e.g., when processing demands are below a threshold), or any other suitable time. At 906, the controller retrieves a message intended for such controller from the queue, and at 908 content of the controller are updated based at least in part upon contents of the message. For example, the message can be provided by a high-level control application, wherein the application deems it desirable to alter one or more parameters associated with a control process. The controller can interpret content of the message and alter control logics therein based upon such contents. At 910, a report confirming alteration of content of the controller can be generated by the controller, and at 912 the report can be provided to the queue. Therefore, an application responsible for the alteration or an application that needs to be informed of the alteration can access the queue and receive the report. The methodology 900 then completes at 914.

Turning now to FIG. 10, a methodology 1000 for automatically prioritizing messages in a queue within an industrial automation environment is illustrated. The methodology 1000 initiates at 1002, and at 1004 a queue is provided, wherein the queue is utilized to retain messages that conform to a message queuing protocol. For example, the queue can be located within a controller, a server, or any other suitable device within an industrial environment. Moreover, the queue can be employed to at least temporarily retain messages received from and/or intended for a controller, where the controller can analyze and interpret messages that conform to the message queuing protocol. At 1006, a request to access the queue can be received, wherein the request can be provided by a controller, an application, or other suitable device within the industrial environment. At 1008, the requesting entity is authenticated prior to enabling the requesting entity to retrieve messages within the queue. For instance, the request can include a unique identifier that identifies the device initiating the request. If a user is associated with the request, username, password, biometric indicia, and/or the like can be received and analyzed to determine whether the user is authorized to access the queue.

At 1010, messages associated with the requesting entity are automatically prioritized, such that most urgent messages are provided to the requesting entity first. Thus, if the requesting entity can connect to the queue for a limited period of time, it will receive messages associated with most urgency when compared to other messages within the queue. In accordance with one aspect, urgency can be defined based upon time of receipt. In other words, the queue can utilize a first in first out (FIFO) approach to manage receipt and provision of messages to a controller and/or applications. In another example, an attribute can be utilized that enables originators of the messages to describe levels of urgency of messages. Still further, messages can be prioritized based upon an urgency attribute and the passage of time. Thus, initially a message can be associated with low priority, but as time passes the priority of the message can automatically alter within the queue. The methodology completes at 1012.

Figure 11:
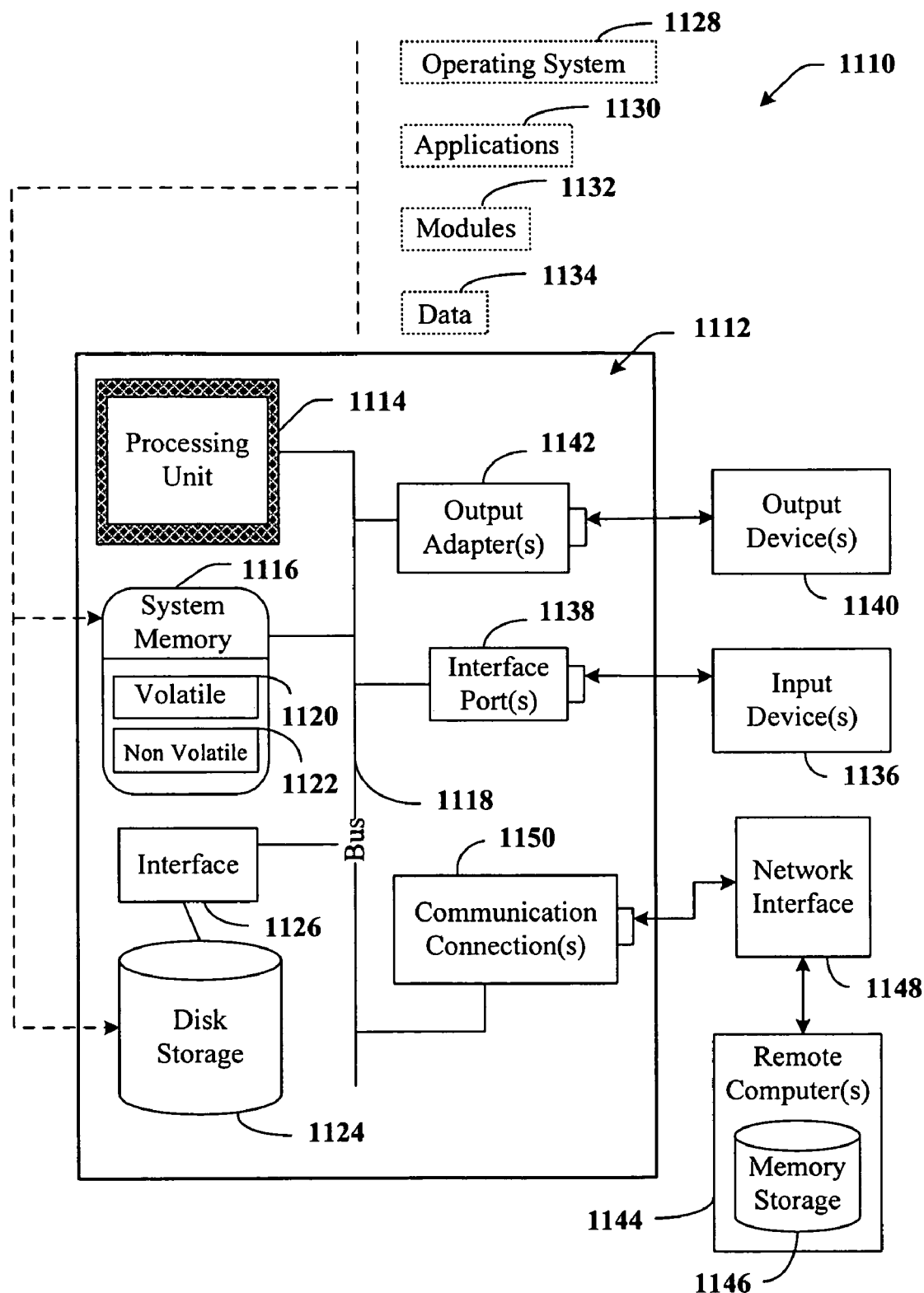
FIG. 11 is an exemplary computing environment that can be utilized in connection with the claimed subject matter.

With reference to FIG. 11, an exemplary environment 1110 for implementing various aspects of the claimed subject matter, including enabling controllers to communicate by way of a message queuing protocol, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
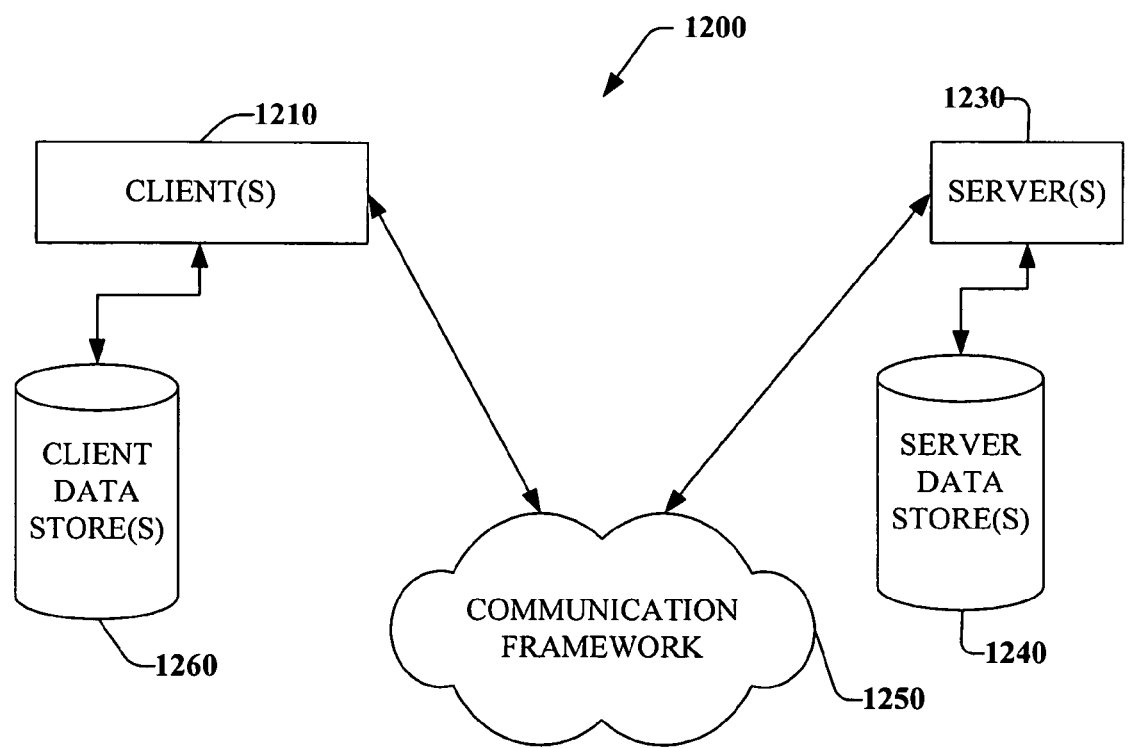
FIG. 12 is an exemplary networking environment that can be utilized in connection with the claimed subject matter.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial controller, comprising:
   at least one connection to associated one or more of sensors or actuators;
   a receiver component that receives a message from a queue, the message conforms to a message queuing protocol, the receiver component accesses the queue to request messages intended for the industrial controller when processing associated with the industrial controller is below a threshold and disconnects from the queue upon retrieving the messages from the queue; and
a message queuing engine communicatively coupled to the receiver component that interprets the message and alters control logics within the controller based at least in part upon contents of the message to control an industrial application.

2. The controller of claim 1 being one of a programmable logic controller and a robotic controller.

3. The controller of claim 1, the message queuing engine generates a report upon altering the control logics, the report is formatted as a message that conforms to the message queuing protocol.

4. The controller of claim 3, the receiver component provides the report to the queue.

5. The controller of claim 1, the receiver component periodically accesses the queue to request messages intended for the controller.

6. The controller of claim 1, further comprising a transaction component that reprograms the controller to a previous state if the queue fails.

7. The controller of claim 1, further comprising a transaction component that reprograms the controller to a previous state if an application that created the message fails.

8. The controller of claim 1, further comprising a backup component that maintains a log of alterations to control logics of the controller.

9. The controller of claim 8, the log includes times that the controller has been altered based upon received messages.

10. The controller of claim 1, the message queuing engine is configured to generate messages that conform to the message queuing protocol.

11. The controller of claim 10, further comprising a priority generator component that associates priorities with messages generated by the message queuing engine, the priorities are employed by the queue to provide the messages to related applications.

12. The controller of claim 10, further comprising a process analysis component that analyzes status of a process associated with the controller, the message queuing engine generates a message based at least in part upon the analysis.

13. The controller of claim 12, the process analysis component recognizes occurrence of an alarm within the process, the message queuing engine generates a message based at least in part upon occurrence of the alarm.

14. The controller of claim 12, the process analysis component recognizes occurrence of a predefined event within the process, the message queuing engine generates a message based at least in part upon occurrence of the predefined event.

15. The controller of claim 1, the message queuing protocol is the MQ protocol.

16. The system of claim 1, the message queuing protocol enables asynchronous communication between an ERP application and the controller.

17. A message queuing system for utilization in an industrial automation environment, comprising:
a queue that retains messages that conform to a message queuing protocol; and
an industrial controller that retrieves a message from the queue when processing associated with the industrial controller is below a threshold and disconnects from the queue upon retrieving the message from the queue, control logics of the controller are updated based at least in part upon the retrieved message to control an industrial application, wherein the industrial controller includes at least one connection to associated one or more of sensors or actuators.

18. The message queuing system of claim 17, the controller is configured to generate a message that conforms to the message queuing protocol and is further configured to provide the message to the queue.

19. The message queuing system of claim 17, a web server comprises the queue.

20. The message queuing system of claim 19, further comprising a remote device that provides a message to the queue by way of the Internet.

21. The message queuing system of claim 17, the queue comprises a security component that ensures that an entity requesting access to the queue is authorized to access the queue.

22. The message queuing system of claim 17, the queue comprises a prioritization component that prioritizes messages within the queue for applications and devices that are associated with the queue.

23. A method for utilizing a message queuing protocol within an industrial automation environment, comprising:
configuring an industrial controller to receive a message from a queue when processing associated with the industrial controller is below a threshold and disconnecting from the queue upon retrieving the message the message conforms to a message queuing protocol;
configuring the controller to alter control logics therein based at least in part upon content of the received message to control an industrial application, wherein the controller includes one or more connection to associated one or more of sensors or actuators; and
configuring the controller to asynchronously communicate with an application.

24. The method of claim 23, further comprising configuring the controller to generate a message in response to the received message, the generated message conforms to the message queuing protocol.

25. The method of claim 23, further comprising associating the controller with a message queue.

26. The method of claim 23, further comprising configuring the controller to log instances that the control logics have been modified based upon received messages.

27. The method of claim 23, the message queuing protocol is MQ.

28. An industrial control system, comprising:
means for providing an industrial controller with a message when processing associated with the industrial controller is below a threshold and disconnects from the queue upon retrieving the messages from the queue, the message conforms to a message queuing protocol;
means for interpreting content of the message; means for altering control logics within the controller based at least in part upon content of the received message to control an industrial application, wherein the controller includes at least one connection to associated one or more of sensors and actuators; and
means for providing asynchronous communication between the industrial controller and an application.

29. A control system, comprising:
a message queue operatively connected to a controller the controller comprising:
at least one connection to one or more of sensors and actuators;
a receiver component that receives a message from a queue, the receiver component accesses the queue to request messages intended for the industrial controller when processing associated with the industrial controller is below a threshold and disconnects from the queue upon retrieving the messages from the queue, the message conforms to a message queuing protocol; and a message queuing engine communicatively coupled to the receiver component that interprets the message and alters control logics within the controller based at least in part upon contents of the message to control an industrial application; and a backup component that maintains a log of alterations to control logics of the controller.

30. The method of claim 23, wherein the application is a enterprise resource planning (ERP) application and the application disconnects from the queue upon providing a message intended for the industrial controller to the queue.

31. The method of claim 30, wherein the queue retains the message until the message is requested from a recipient entity of the message.

32. The method of claim 30, wherein the controller monitors the queue and request messages that are intended for the controller.

* * * * *